United States Patent [19]
Erman et al.

[11] Patent Number: 4,708,423
[45] Date of Patent: Nov. 24, 1987

[54] OPTICAL WAVE GUIDES AND COUPLING MEMBER MONOLITHICALLY INTEGRATED ON A SEMICONDUCTOR SUBSTRATE

[75] Inventors: Marko Erman, Paris; Jean-Bernard Theeten, Ozoir-la-Ferriere; Nakita Vodjdani, Paris, all of France

[73] Assignee: U.S. Philips Corp., New York, N.Y.

[21] Appl. No.: 773,701

[22] Filed: Sep. 9, 1985

[30] Foreign Application Priority Data

Sep. 25, 1984 [FR] France .................. 84 14683

[51] Int. Cl.⁴ ............................................. G02B 6/10
[52] U.S. Cl. .............................. 350/96.15; 350/96.11; 350/96.12
[58] Field of Search ............... 350/96.10, 96.11, 96.12, 350/96.13, 96.15, 96.14

[56] References Cited

U.S. PATENT DOCUMENTS 3,970,360  7/1976  Kersten et al. ............ 350/96.12 X
4,492,426  1/1985  Nicia et al. ................ 350/96
4,609,252  9/1986  Wong et al. ............... 350/96.15 X

OTHER PUBLICATIONS

Buchmann, P., et al. "Optical Y-Junctions and S-Bends formed by Preferentially Etched Single-Mode RIB Waveguides in InP," *Elec. Lett.*, vol. 18, No. 19, pp. 850–852 (Sep. 16, 1982).
Chane, J. P., et al. "Etude de L'Epitaxie Localisee du GaAs," *J. Crys. Growth*, vol. 13/14, pp. 325–330 (1972).
Erman, M., et al. "Low Loss Waveguides Grown on GaAs Using Localized Vapor Phase Epitaxy," *Appl. Phys. Lett*, vol. 43, No. 10, pp. 894–895 (Nov. 15, 1983).

Primary Examiner—Eugene R. LaRoche
Assistant Examiner—Steven J. Mottola
Attorney, Agent, or Firm—Marc D. Schechter

[57] ABSTRACT

A coupling member between an input light wave guide transporting a main light beam and secondary light wave guides each transporting a part of the intensity of the main light beam. The coupling member is monolithically integrated with the wave guides on a semiconductor substrate. The coupling member comprises a plate having parallel surfaces perpendicular to the plane of the substrate. The plate has a refractive index different from that of the main light wave guide. The parallel surfaces of the plate form interfaces separating the propagation medium of the wave guides (I, R, T) from the propagation medium constituted by the plate.

25 Claims, 31 Drawing Figures

OPTICAL WAVE GUIDES AND COUPLING MEMBER MONOLITHICALLY INTEGRATED ON A SEMICONDUCTOR SUBSTRATE

BACKGROUND OF THE INVENTION

The invention relates to a semiconductor device comprising a coupling member. The coupling member couples an input light wave guide transporting a main light beam to secondary light wave guides each transporting a part of the intensity of this main light beam. The light wave guides are made of a semiconductor material. The coupling member is monolithically integrated with the wave guides on a semiconductor substrate.

The invention further relates to interferometer arrangements including such a coupling member and monolithically integrated therewith.

The invention finally relates to a method of manufacturing such a coupling member and interferometer arrangements The invention may be used in, for example, the formation of modulators integrated on a substrate of gallium arsenide. The device modulates light sources, such as lasers, and is intended to operate at very high frequencies, i.e. of the order of 5 to 10 GHz. Such a device is suitable for use in the field of telecommunication. The invention may also be used in the formation of laser cavities, also integrated on gallium arsenide.

Such a coupling member between light wave guides is known from an article by P. Buchmann and A. J. N. Houghton entitled "Optical Y-Junctions and S-Bends Formed by Preferentially Etched Single-Mode RIB Waveguides In InP" (*Electronics Letters*, Sept. 16, 1982, Vol. 18, No. 19, pages 850–852). This article discloses a structure for separating light beams obtained by means of wave guides integrated on a substrate of indium and phosphide. The structure consists of a junction of the form of a Y. This structure is obtained by epitaxial growth of an n⁻ type layer on an n⁺ substrate, and by a chemical attack of this layer through the openings of a mask.

After the chemical attack, the structure for separating beams appears in the n⁻ type layer. The light wave guides have a rectangular cross-section and their external faces are formed so as to be as smooth as possible in order to improve the confinement of the light. The aperture angle of the branches of the junction is on the order of 0.9°.

This known member has numerous disadvantages. First, in spite of the small aperture of the branches of the Y junction, the losses due to the device design itself in addition to the losses due to the manufacturing method reach a very high value on the order of 4 dB. Furthermore, due to this small aperture, the branches of the junction necessarily have a great length, which can reach a value of 2 mm to assume that the light wave guides coupled to the branches are sufficiently remote from each other and do not interfere with each other. As a result, the members obtained by these structures have large dimensions.

Moreover, the main light wave guide of such a structure cannot admit several modes at a time, because the mode conversion provided by the Y-junction is not compatible with this operation.

Finally, when this structure is utilized for combining beams, if the beams entering at the branches of the Y are in phase, the light in fact emanates in an adequate manner through the main light wave guide. However, if the entering beams are in relative phase opposition, their recombination provides an optical mode of higher order—different from the fundamental mode. This higher order mode does not follow the main light wave guide and radiates into the substrate. In this case, the signal is lost. Consequently, such a structure cannot be utilized for forming, for example, an interferometer of the so-called "Michelson" type.

SUMMARY OF THE INVENTION

It is an object of the invention to provide a small, low-loss coupling member which is not phase dependent.

According to the invention, the coupling member comprises a plate having parallel surfaces perpendicular to the substrate and having a refractive index different from that of the main light wave guide. The parallel surfaces of the plate form the interface separating the propagation medium constituted by the light wave guides from the propagation medium constituted by the plate.

In these conditions, the coupling member has numerous advantages. First the losses are low. Further, this member has very small dimensions only slightly larger than the cross-section of the light wave guides.

Moreover, the plate subdivides a main beam into at most two beams, one of which is transmitted, while the other is reflected. The intensities of each of the beams can be chosen as a function of the angle of incidence of the main beam, of the thickness of the plate and of its index. To this end, numerous materials can be used to form the plate (i.e. from dielectric materials to the various semiconductor materials) so that elements can become available having all kinds of different refraction indices.

Finally, irrespective of the phase difference between incident beams, the output beams are always parallel to the substrate and consequently can be transported by light wave guides.

DESCRIPTION OF THE PREFERRED EMBODIMENTS

Figure 1A:
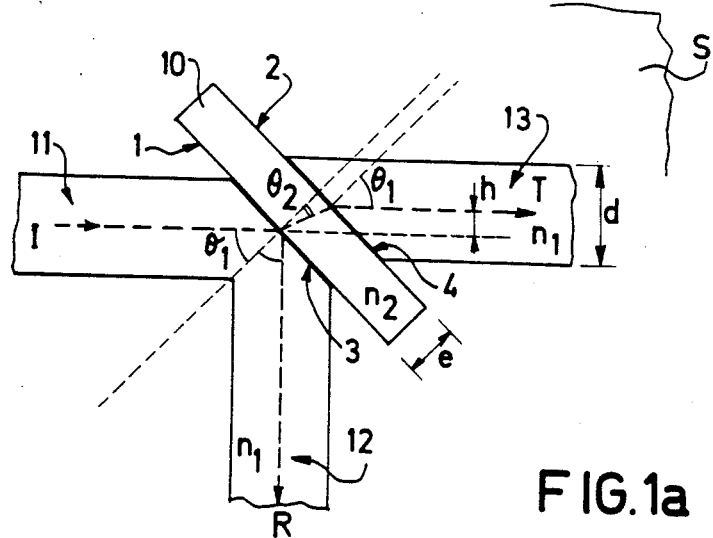
FIGS. 1a, 1b and 1c show in plan view the coupling member according to the invention in the case in which the plate has a refractive index higher than that of the light wave guides, in the case in which the plate has an index slightly lower than that of the light wave guides, and in the case in which the plate has an index considerably lower than that of the light wave guides, respectively.

As shown in FIGS. 1a, 1b, 1c and 1d, the coupling member according to the invention comprises a plate denoted by reference numerals 10, 20, 30 and 40, respectively. The plate is arranged perpendicular to a semiconductor substrate S. The plate has parallel surfaces 1 and 2.

The plate receives at an angle $\theta_1$ an incident beam I transported by the main (input) light wave guide designated by reference numerals 11, 21, 31, and 41, respectively. The exit surface of the main light wave guide is cut in such a manner that the entrance surface of the plate constitutes the diopter 3 separating the medium constituting the guide having the refractive index $n_1$ from the medium constituting the plate having the refractive index $n_2$. Several cases alternatives may follow.

FIG. 1a shows the paths of the light beams in the case in which the plate 10 has a refractive index $n_2$ higher than the index $n_1$ of the main wave guide 11. The incident beam I is totally received by the plate and is subdivided by the plate into two beams: one reflected beam R, and one refracted and transmitted beam T. The beam R is reflected at the angle $\theta_1$ and is transported by the secondary output wave guide 12. The beam T is refracted in the plate at the angle $\theta_2 < \theta_1$, leaves the plate at the angle $\theta_1$ and is transported by the secondary output guide 13.

The entrance surfaces of the secondary output wave guides 12 and 13 are cut in such a manner that each surface opposite to the plate 10 constitutes the interfaces 3 or 4, respectively. Each interface separates the medium constituting the wave guide from the medium constituting the plate.

Figure 1B:
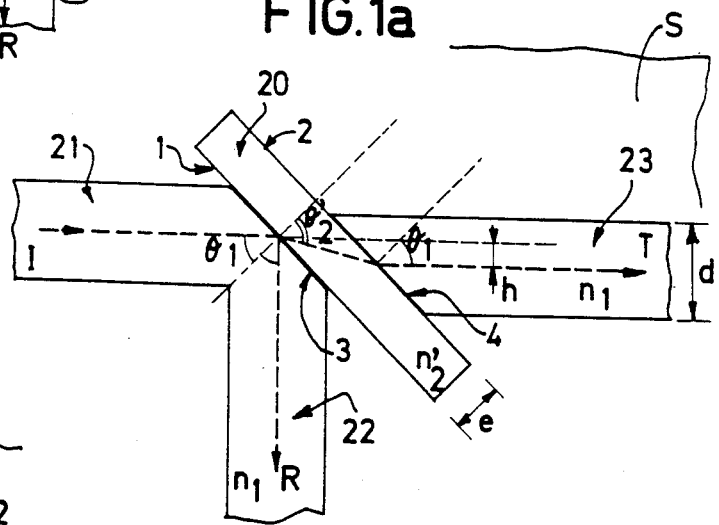

FIG. 1b shows the paths of the light beams in the case in which the plate 20 has an index $n'_2$ slightly lower than the index $n_1$ of the main light wave guide 21. The incident beam I is totally received by the plate and is subdivided by the plate into two beams: one reflected beam R, and one refracted and transmitted beam T. The beam R is reflected at the angle $\theta_1$ and is transported by the secondary output wave guide 22. The beam T is refracted in the plate at the angle $\theta_2 > \theta_1$, leaves the plate at the angle $\theta_1$ and is transported by the secondary output guide 23.

In the two preceding cases, the displacement h of the transmitted beam T with respect to the axis of the incident beam increases as the difference between the indices of the two media increases, and as the thickness of the plate increases.

On the other hand, the secondary output wave guides in all the examples have the same refractive index as the main light wave guide. This is not essential to the invention, and is only chosen for the sake of simplifying the description.

Figure 1C:
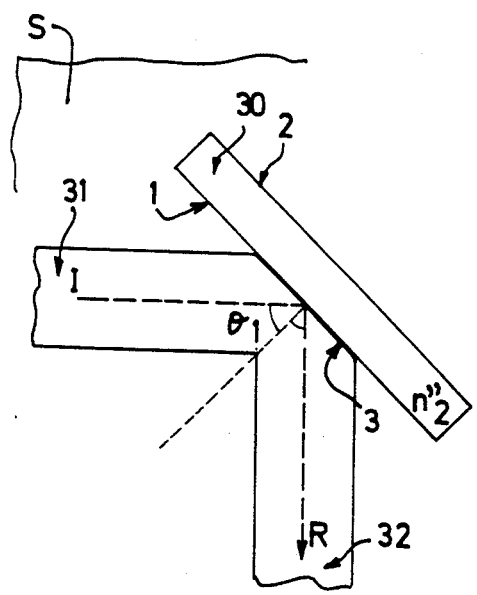

FIG. 1c shows the paths of the light beams in the case in which the plate 30 has refractive index $n''_2$ considerably lower than the refractive index $n_1$ of the main wave guide 31. The incident beam I, which is totally received by the plate, is then subjected to a total reflection at an angle $\theta_1$. The reflected beam R is transported by the secondary output guide 32.

The intensities of the reflected beam and the transmitted beam, respectively, are a function of the angle of incidence $\theta_1$, the thickness e of the plate, and the refractive index of the plate. More particularly for a given angle of incidence, which is often chosen to be 45° for numerous applications, values of 50% for the relative intensities of the reflected beam and of the transmitted beam can readily be obtained, and simply depend upon the index and thickness of the plate. On the other hand, it should be noted that the realistic calculation of the intensity of the reflected and the transmitted wave has to take into account the effect of interference in the plate.

Finally, in the case in which the refractive index of the plate is considerably lower than that of the light wave guides (FIG. 1c), a total reflection is obtained if the thickness e of the plate is large, i.e. a few microns. However, if the thickness is small, on the order of 1 $\mu$m or less than 1 $\mu$m, the evanescent wave in the plate causes a transmitted beam to be formed, whose intensity can be comparatively high.

Figure 1D:
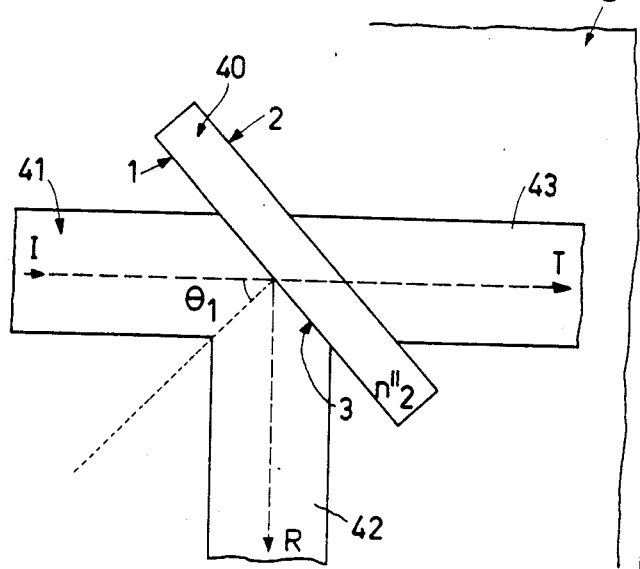
FIG. 1d shows in plan view a coupling member according to the invention which receives only part of the input flux.

FIG. 1d shows the paths of the light beams in the case in which the plate 40 has a refractive index $n''_2$ which is considerably lower than the refractive index $n_1$ of the main light wave guide 41. However, the plate 40 is provided in such a manner that it receives only part of the incident flux.

Figure 2A:
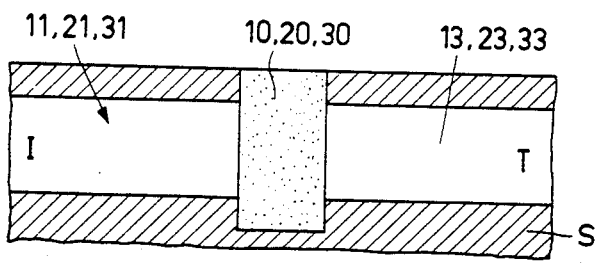
FIG. 2a shows in a simplified sectional view the coupling member when the incident beam is entirely received by the plate.
Figure 2B:
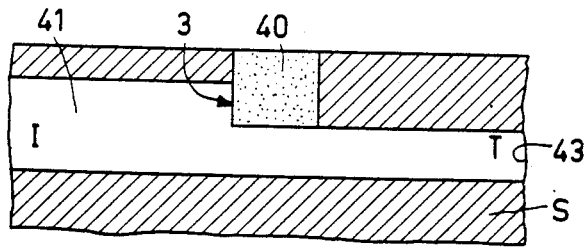
FIG. 2b shows in a simplified sectional view the member when the incident beam is partly received by the plate.

FIG. 2b shows a simplified sectional view of the plate 40. The plate 40 does not cover the whole of the section of the main wave guide 41, as was the case in FIGS. 1a, 1b and 1c. FIG. 2a shows a sectional view of the plate 10, 20, or 30.

In the case of FIG. 1d, the part of the beam which is received by the plate 40 is totally reflected at the angle $\theta_1$ to form the reflected beam R transported by the secondary output guide 42. The part of the incident beam I which does not meet the plate 40 is entirely transmitted and forms the output beam T transported by the secondary output guide 43.

This manner of subdividing the incident beam into two output beams is particularly advantageous due to the fact that the plate 40, whose refractive index $n''_2$ is chosen to be considerably lower than the refractive index $n_1$ of the wave guides, can be a simple air plate having a section smaller than that of the main wave guide 41.

Figure 3A:
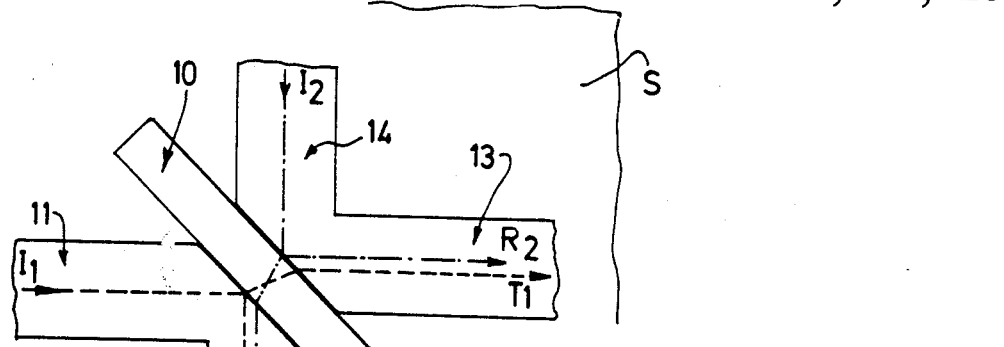
FIGS. 3a, 3b, and 3c show in plan view coupling members according to the invention having two inputs.
Figure 3B:
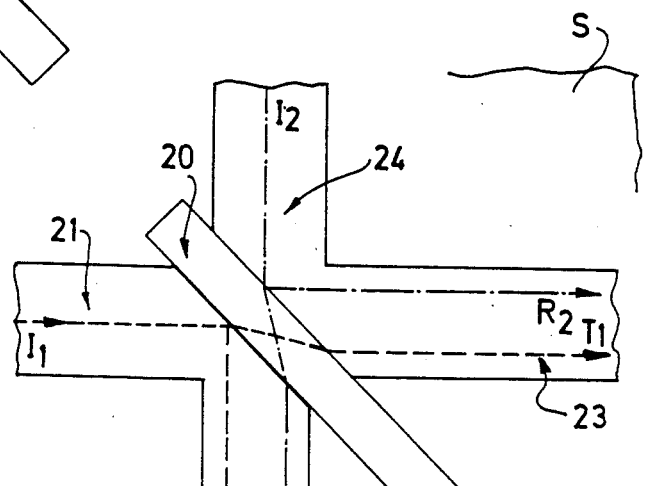
Figure 3C:
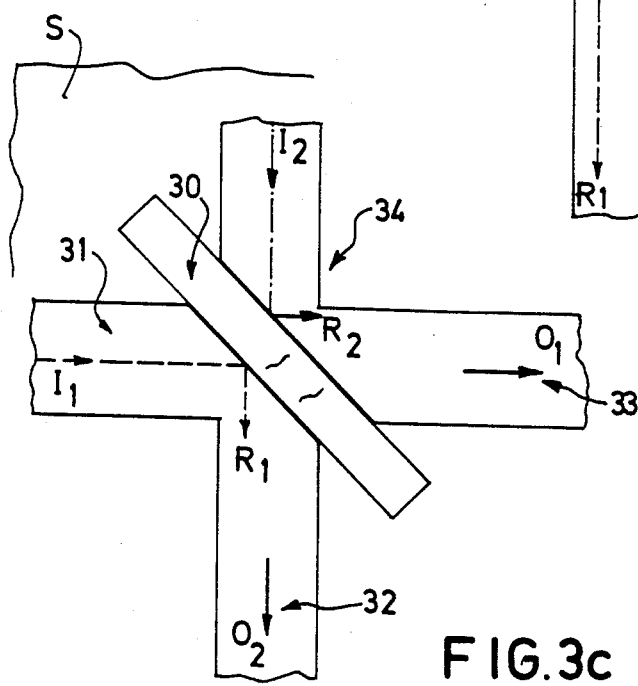

As shown in FIGS. 3a, 3b and 3c the coupling member according to the invention, formed from the plates denoted by reference numerals 10, 20 and 30, respectively, may receive two incident beams $I_1$ and $I_2$.

FIG. 3a shows the paths of the light beams when the plate 10 has a refractive index $n_2$ higher than the refractive index $n_1$ of the wave guides 11 and 14 which transport the incident beams $I_1$ and $I_2$, respectively. The beams each produce a reflected beam and a transmitted beam $R_1$ and $T_1$, and $R_2$ and $T_2$, respectively, to be formed. The beams $R_1$ and $T_2$ are transported by the wave guide 12. The beams $R_2$ and $T_1$ are transported by the wave guide 13.

FIG. 3b shows the paths of the light beams when the plate 20 has a refractive index $n'_2$ slightly lower than the index $n_1$ of the wave guides 21 and 24 which transport the incident beams $I_1$ and $I_2$. The beams each produce a reflected beam and a transmitted beam $R_1$ and $T_1$, and $R_2$ and $T_2$, respectively. The beams $R_1$ and $T_2$ can be transported by the wave guide 22, and the beams $R_2$ and $T_1$ can be transported by the wave guide 23 if the refractive index $n'_2$ of the plate does not differ too greatly from the refractive index $n_1$ of the guides.

FIG. 3c shows the case in which, the refractive index $n''_2$ of the plate 30 is considerably lower than the refractive index $n_1$, and the thickness e of the plate is very small. The incident beams $I_1$ and $I_2$ carried by the wave guides 31 and 34 produce reflected beams $R_1$ and $R_2$. Transmitted beams $O_1$ and $O_2$ are formed from the evanescent waves carried by the wave guides 33 and 32.

It is clear that by means of the member according to the invention an incident beam can be subdivided into two beams, whose angles and intensities can be chosen independently by proper selection of the index, the thickness of the plate, and the section of the plate with respect to that of the main light wave guide.

It is also clear that two beams can be combined to form at least one beam which can still be utilized for influencing the same parameters. Therefore, the member according to the invention can be advantageously used for forming interferometer arrangements monolithically integrated on semiconductors.

Figure 4A:
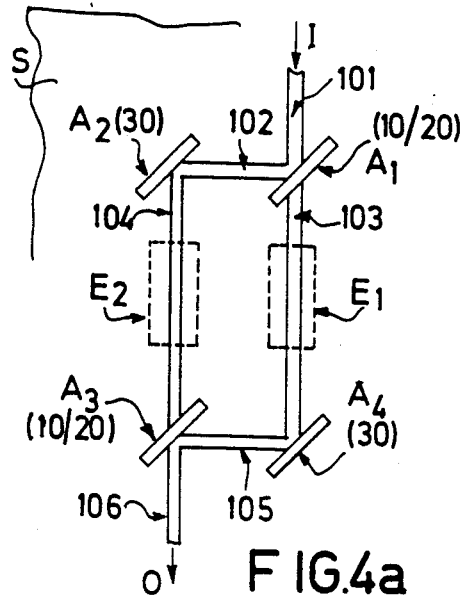
FIGS. 4a, 4b, 4c, 4d, and 4e show in plan view an interferometer of the so-called "Mach-Zehnder" type, an interferometer of the so-called "Michelson" type, an interferometer of annular form, an interferometer of the "Mach-Zehnder" type coupled to a laser source, and a laser in annular form, respectively, using coupling members according to the invention.

FIG. 4a shows an interferometer of the "Mach-Zehnder" type monolithically integrated on a substrate S. The interferometer includes four coupling members according to the invention. A first plate $A_1$ of the type 10, 20 or 40 described hereinbefore receives an incident beam I carried by the guide 101 at an angle of 45°. The first plate $A_1$ supplies two beams, one of which is reflected and the other of which is transmitted and which are carried by the wave guides 102 and 103; the plate $A_2$ of the type 30 receives the beam carried by the wave guide 102 at an angle of 45° and supplies a reflected beam carried by the guide 104. A plate $A_4$ of the type 30 receives the beam carried by the wave guide 103 at an angle of 45° and supplies a reflected beam carried by the guide 105. The plate $A_3$ finally receives at an angle of 45° each of the beams carried by the wave guides 104 and 105 and supplies a beam O resulting from their recombination and carried by the output wave guide 106.

Electrodes $E_1$ and $E_2$ arranged on the wave guide branches 103 and 104 permit one to modulate the intensity and the phase of the guided light and the output O.

These electrodes can be Schottky barrier electrodes formed by metallic evaporation, for example of nickel-platinum-gold (Ni-Pt-Au) at the surfaces of the light wave guides. This electrode may have a dimension parallel to the axis of the wave guides of 2 to 4 mm, and may have a dimension at right angles to the axis of the wave guides as small as possible (i.e. exceeding by the smallest possible amount the lateral dimension of the wave guides themselves) in order not to provide an excessively high capacitance.

Such electrodes permit one to produce a considerable electric field at the level of the light wave guide. This field, due to the electro-optical linear effect, modifies the refractive index of the guide in the region of the electrode by introducing a difference in refractive index according to the equation $$n = n^3 \times r \times E,$$

in which n is the refractive index of the guide, E is the electric field and r is a constant of the material depending upon the crystallographic direction of the wave guides with respect to the crystallographic plane of the substrate.

The electrodes are biased by applying a voltage between the Schottky electrodes and a reference electrode, for instance an ohmic contact to the substrate. Such a contact may be a gold-germanium-nickel alloy.

Figure 4D:
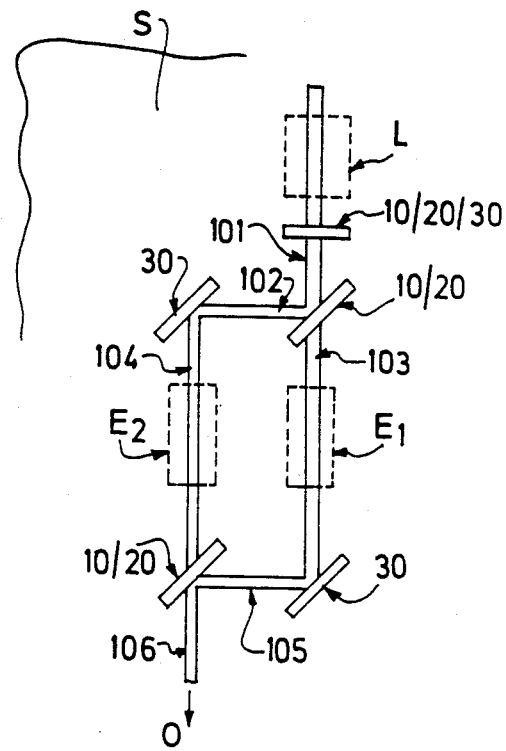
Figure 4B:
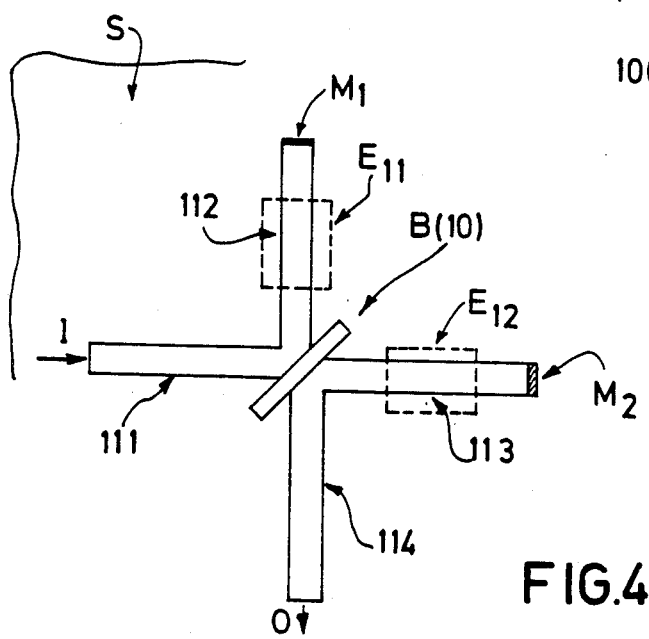

FIG. 4b shows an interferometer of the "Michelson" type monolithically integrated on a substrate S and including a single coupling member according to the invention. A plate B preferably of the type 10 described above receives an incident beam I carried by the wave guide 111 at an angle of 45°. This plate supplies a reflected beam carried by the wave guide 112 and a transmitted beam carried by the wave guide 113. The end surfaces of the wave guides 112 and 113 are cut at right angles to the axes and are provided, for example, with metallizations forming mirrors $M_1$ and $M_2$.

The beams carried by these wave guides are reflected by the mirrors $M_1$ and $M_2$, and then return to the plate B at an angle of 45° to form the output beam O, which is carried by the wave guide 114. Electrodes $E_{11}$ and $E_{12}$ are arranged on the guides 112 and 113 in order to phase-modulate these beams to intensity-modulate the output O.

Figure 4C:
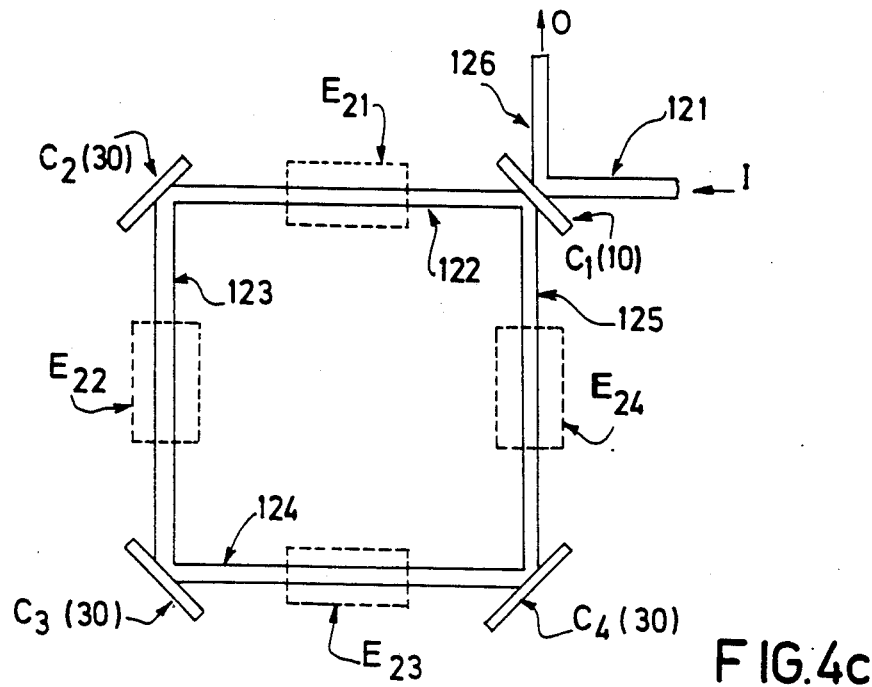

FIG. 4c shows an annular interferometer monolithically integrated on a substrate S and including four members according to the invention. A plate $C_1$ preferably of the type 10 described above receives a beam I carried by the wave guide 121 at an angle of 45°. Plate $C_1$ supplies two beams, one of which is reflected and the other of which is transmitted and which are carried by the wave guides 122 and 126. The plate $C_2$ of the type 30 receives at an angle of 45° the beam carried by the wave guide 122 and supplies a reflected beam carried by the wave guide 123. The beam carried by the wave guide 123 is further reflected twice, by the plates $C_3$ and $C_4$, respectively, of the type 30. The latter reflected beam carried by the wave guide 125 passes through the plate $C_1$ to form the output beam O. Electrodes $E_{21}$, $E_{22}$, $E_{23}$ and $E_{24}$ are arranged on each wave guide branch 122, 123, 124 and 125 to phase-modulate the beams carried by these wave guides.

By providing four electrodes instead of with two electrodes, a larger phase difference can be obtained.

FIG. 4d shows how each of these interferometers (in this case an interferometer of the "Mach-Zehnder" type, for example) can be associated with a laser. A laser element L is coupled to a cavity which can advantageously be a plate of the type 10 or 20 or 30. The laser/cavity combination is arranged on the input branch 101 of the beam.

This arrangement has the advantage that it permits one to modulate the interferometer instead of modulating the laser.

Further, this arrangement can also be used to advantage by deleting the laser cavity and by directly coupling the laser to the interferometer itself. Then a large cavity is obtained, which increases the stability of the laser, (i.e. provides a satisfactory monomode operation).

Figure 4E:
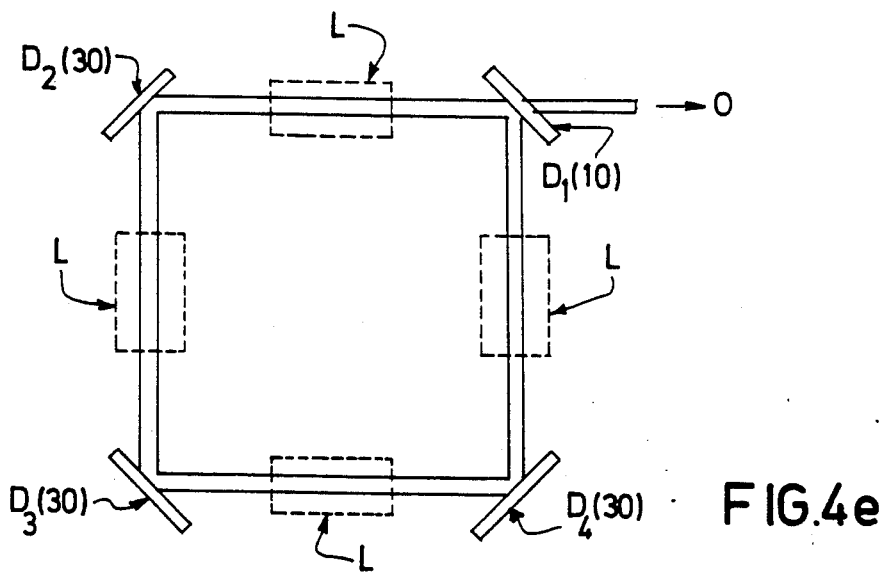

FIG. 4e shows a laser structure formed by an annular cavity obtained by four members according to the invention. This structure is very similar to the structure of the annular interferometer. It comprises a semi-reflecting plate $D_1$ of the type 10 or 40 and three total-reflection plates $D_2$, $D_3$ and $D_4$ of the type 30. The guidance can be provided by gain or by index. The annular lasers are used in known manner to obtain a particularly high stability.

The different interferometer arrangements described above are advantageously used in the formation of completely integrated light source modulators, for example, laser modulators. If the substrate and the wave guides are made, for example, of gallium arsenide or in general an $A^{III}, B^V$ compound, very high operating frequencies are obtained, especially frequencies lying between 5 and 10 GHz.

These arrangements can further be used in the formation of integrated trapping devices if the phase difference applied to the branches of the interferometer depends upon a physical quantity.

A method of manufacturing the coupling member according to the invention is described below. This method can be utilized equally well with buried wave guides as with erected wave guides. The latter can alternatively be obtained either by etching, for example chemical etching, or by epitaxial growth.

The manufacturing method comprises the following steps.

Figure 5A:
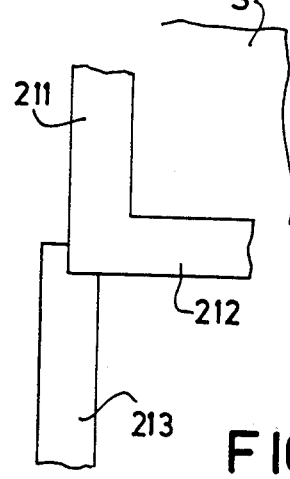
FIGS. 5a, 5b, 5c, 5d and 5e show in plan view the different stages of a method of manufacturing a coupling member according to the invention.

First, a semiconductor substrate S, which is either of the n+ type or semi-insulating, is provided with an n+ type confinement layer. Main input wave guide 211 and secondary input and output wave guides 212 and 213, respectively, are formed on the substrate S. Their relative orientations are provided by calculations. (FIG. 5a.)

This substrate S is preferably chosen to be made of monocrystalline gallium arsenide (GaAs). The material of the n+ type can be doped at $3.10^{18}$ charge carriers per $cm^3$.

The input wave guides 211 and the secondary output wave guides 212 and 213 are formed advantageously on a crystallographic (100) surface of the substrate S. They can be oriented, for example, for the wave guides 213 and 211 in accordance with the crystallographic [110] directions and for the wave guide 212 according to the crystallographic [110] axis. The wave guide 212 is then perpendicular to the wave guides 211 and 213. The semi-reflecting plate then formed will have surfaces parallel to the crystallographic (110) plane in such a manner that they are inclined at 45° to the wave guides.

The wave guides are formed on the substrate S by the method described in an article by M. Erman et al entitled "Low loss waveguides grown on GaAs using localized vapour phase epitaxy" (*Applied Physics Letters*, Vol. 43, No. 10, Nov. 15, 1983, p. 894-895), or also described in an article by J. P. Chane et al entitled "Etude de L'Epitaxie Localisee du GaAs (*Journal of Crystal Growth*, Vol. 13/14, pp. 325-330, 1972).

Figure 6A:
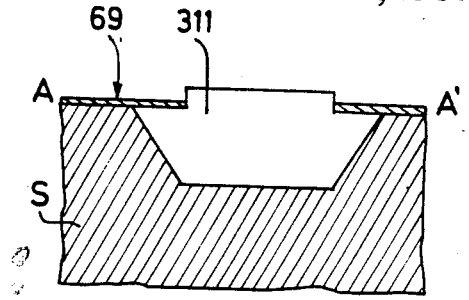
FIGS. 6a, 6b, 6c and 6d show different light wave guides in cross-section taken on the line AA' of FIG. 5e.
Figure 6B:
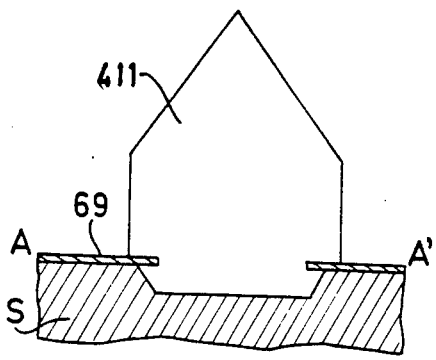
Figure 6C:
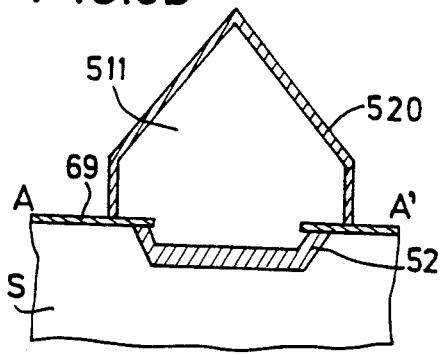

A mask 69 as shown in FIGS. 6a-6c is deposited on the crystallographic (100) surface of the substrate S. This mask may be, for example, a layer on the order of 100 nm thick of dielectric material, such as silicon nitride ($Si_3N_4$) or silica ($SiO_2$). Slots are opened in this dielectric layer at the locations provided for the wave guides 211, 212, and 213. The widths of these openings, oriented, as stated, along the crystallographic [110] or [110] axis, are on the order of 3 μm.

The substrate is then etched, for example chemically, through the openings in the mask so that grooves are formed in the substrate having a depth of about 5 μm.

Subsequently, the wafer of gallium arsenide (GaAs) thus obtained is put into a reactor for epitaxy from the vapor phase.

In order to perfect the crystallographic facets that have been produced during the preceding etching treatment, and which form the edges of the grooves, an anisotropic etching treatment is carried out in the epitaxy reactor. This etching treatment may be effected over a distance on the order of 100 nm. In fact it should be noted that, according to the thermodynamic conditions imposed on the reactor, the latter performs either an etching step or an epitaxial growing step.

After the etching treatment, an epitaxial growing step is performed in the grooves in such a manner that ribbons of gallium arsenide are formed, preferably of the n− type are formed. These ribbons form the light wave guides. The gallium arsenide of the n− type exhibits a doping preferably lower than $10^{15}$ charge carriers per $cm^3$.

Figure 5B:
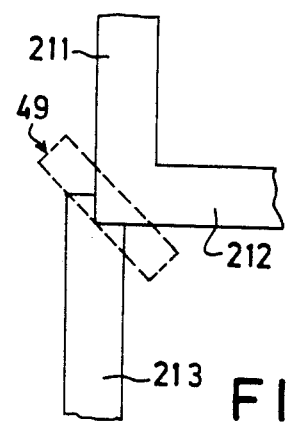
Figure 5C:
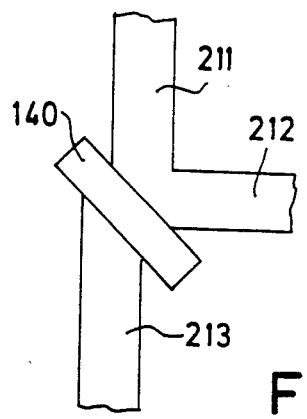

The method of manufacturing the member according to the invention then continues with forming a mask 49 defining the form and the orientation chosen for the plate having parallel surfaces. (FIG. 5b.) The wave guides are then etched, for example chemically through the opening of the mask 49 to a depth slightly larger than the thickness of the wave guides or to a depth which is a function of the quantity of light that should be obtained for the transmitted beam. They are etched perpendicular to the plane of the substrate S (FIG. 5c) in such a manner that a plate void of material is formed.

If the plane-parallel plate is an air plate in order to constitute, for example, a total-reflection plate, the manufacturing process is now terminated.

Figure 5D:
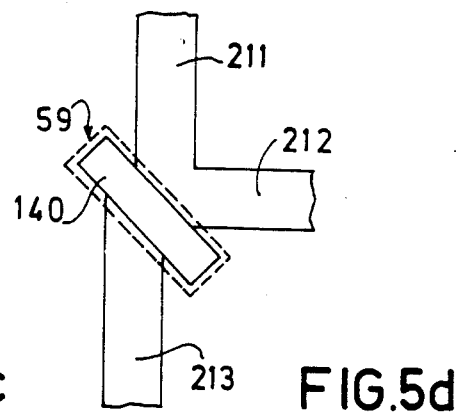
Figure 5E:
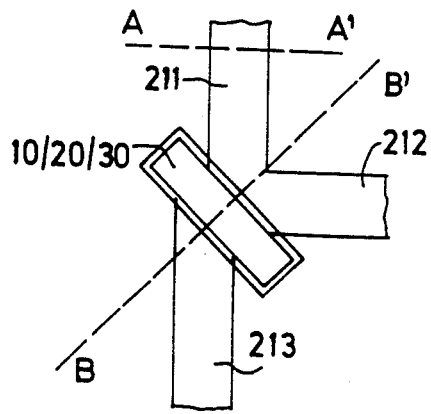

If instead the material of the plate is different from gas or vacuum, the manufacturing process is continued by forming a mask 59 defining a surface area slightly larger than the surface area of the plate, (FIG. 5d.) Plate material is then deposited through the opening in mask 59 onto the substrate S. The plate so produced is of the type 10, 20 or 30. (FIG. 5e.)

This deposition may be performed in any manner compatible with the chosen material.

The material used for forming the masks 49 and 59 may be, for example, silicon nitride ($Si_3N_4$) or silica ($SiO_2$).

FIGS. 6a-6d show in sectional view wave guides obtained by various techniques. The corresponding FIGS. 7a-7d show the members according to the invention obtained by such wave guides.

FIG. 6a shows in sectional view a wave guide 311 of gallium arsenide (GaAs) of the n− type formed in the opening of a mask 69 and entirely buried in the substrate S of n+ gallium arsenide. This guide thus forms a structure of the so-called "PLANAR" type.

Figure 7A:
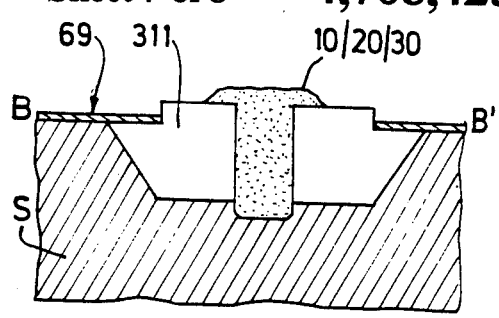
FIGS. 7a, 7b, 7c and 7d show different coupling members in cross-section taken on the line BB' of FIG. 6e.

FIG. 7a shows in sectional view the plate having parallel surfaces associated with these wave guides. Since the wave guide is of the buried type, the plate is also buried. The plate may be obtained, for example, by epitaxial growth in the opening 140 (FIG. 5c) of an $A^{III}B^V$ compound having a refractive index higher than that of gallium arsenide. It is not necessary that there is a conformity between the crystal lattices of the two compounds. A plate of the type 10 of the kind described above is then obtained.

Instead, if the plate is obtained, for example, by epitaxial growth of gallium aluminum arsenide (GaAlAs), whose refractive index is slightly lower than that of gallium arsenide (GaAs), the plate is of the type 20. The plate may alternatively be formed by filling the cavity 140 with a dielectric material. The known dielectric materials generally have a refractive index of approximately 2, which is consequently much lower than the index of gallium arsenide, which is on the order of 3.5. Plates of the type 30 are then obtained. The whole range of indices can be covered by doping dielectric materials or by using ternary or quaternary semiconductor materials.

FIG. 6b shows in sectional view a wave guide 411 obtained by anisotropic epitaxial growth of a crystalline ribbon of n− type gallium arsenide on a substrate of n+ gallium arsenide. The groove from which the localized anisotropic crystal is grown, may be shallower than in the case of FIG. 6a. In fact, the guide in this case is mainly situated above the substrate.

Figure 7B:
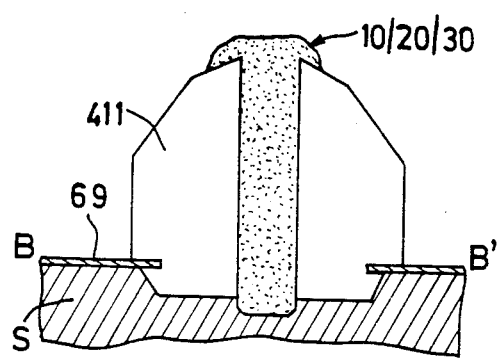

FIG. 7b shows in sectional view the member according to the invention obtained with such a wave guide. The plate having parallel surfaces in this case is situated, like the wave guide, above the substrate. All the materials mentioned above for forming the plate may be used in all of the cases shown in the Figures.

FIG. 6c shows in sectional view a wave guide 511 obtained by anisotropic epitaxial growth from an under-etched part in a substrate S of gallium arsenide. This under-etched part is provided with a n+ type confinement layer 52. The wave guide 511 of the n− type moreover receives an upper confinement n+ layer 520.

Figure 7C:
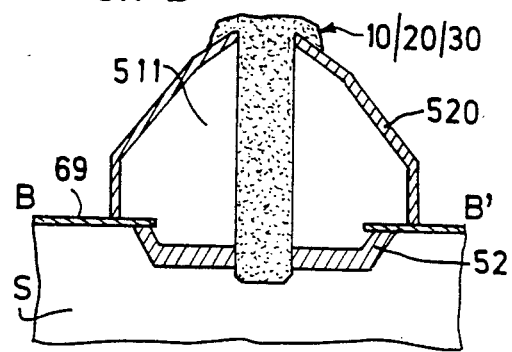

FIG. 7c shows in sectional view the coupling member obtained in this case.

Figure 6D:
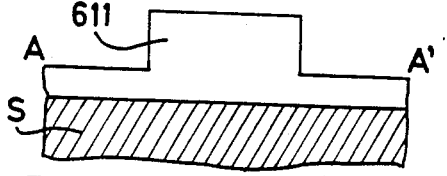
Figure 7D:
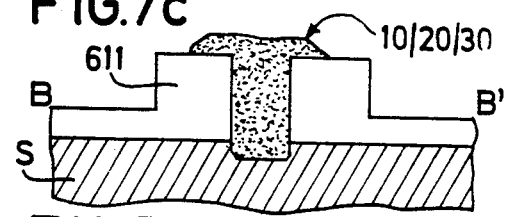
Figure 8A:
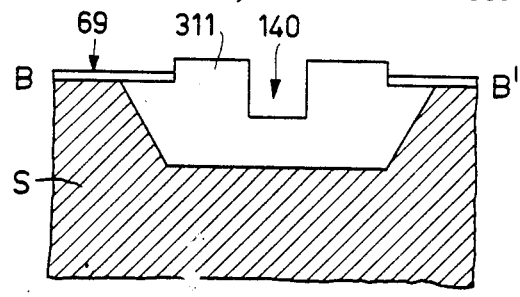
FIGS. 8a, 8b, 8c and 8d show different coupling members in cross-section taken on the line BB' of FIG. 7c when the plate is both an air plate and a partial plate.
Figure 8B:
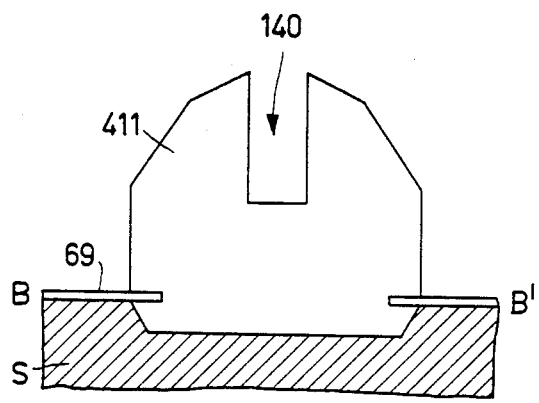
Figure 8C:
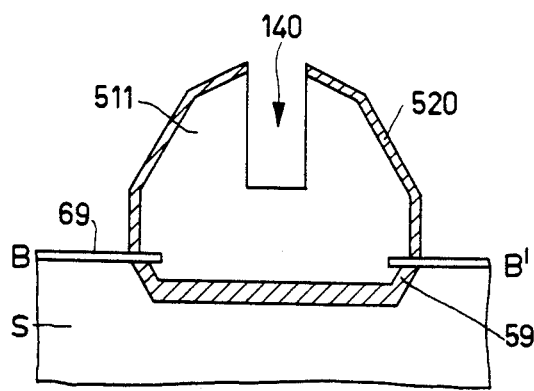
Figure 8D:
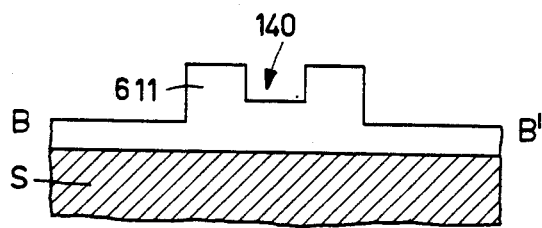

FIG. 6d shows in sectional view a wave guide 611 obtained by slow etching of an epitaxial layer of the n− type formed on a substrate S of n+ gallium arsenide. FIG. 7d shows the coupling member obtained in this case.

FIGS. 8a, 8b, 8c, and 8d show in sectional view the same wave guides as shown in FIGS. 6a, 6b, 6c, and 6d, but with a plane-parallel plate 140 whose depth is smaller than the height of the light wave guide. This plate is an air gas or vacuum plate formed by a single anisotropic etching step.

It is clear that numerous embodiments of such a member are possible without departing from the scope of the invention as defined by the appended Claims.

What is claimed is:

1. An integrated optical component comprising:
   a semiconductor substrate;
   an input optical wave guide monolithically integrated with the substrate, said wave guide having an end face and a refractive index;
   an output optical wave guide monolithically integrated with the substrate, said wave guide having an end face and a refractive index;
   a plate monolithically integrated with the substrate, said plate having a refractive index different from that of the input optical wave guide, said plate having first and second opposite parallel surfaces arranged perpendicular to the substrate, said first plate surface contacting the end face of the input optical wave guide, said second plate surface contacting the end face of the output optical wave guide; and
   a light source monolithically integrated with the substrate, said light source being optically coupled to the input optical wave guide.

2. An integrated optical component as claimed in claim 1, characterized in that:
   the component comprises at least two output optical wave guides; and
   the output optical wave guides have refractive indices equal to the refractive index of the input optical wave guide.

3. An integrated optical component as claimed in claim 2, characterized in that:
   the plate has a refractive index greater than the refractive index of the input optical wave guide;
   one output optical wave guide is arranged to receive light transmitted through the plate; and
   the other output optical wave guide is arranged to receive light reflected by the plate.

4. An integrated optical component as claimed in claim 2, characterized in that:
   the plate has a refractive index less than the refractive index of the input optical wave guide;
   one output optical wave guide is arranged to receive light transmitted through the plate; and
   the other output optical wave guide is arranged to receive light reflected by plate.

5. An integrated optical component as claimed in claim 4, characterized in that the plate has a thickness, and the indices of the plate and wave guides, and the thickness of the plate are chosen so that approximately 50% of light incident on the plate at an angle of 45° is reflected by the plate, and approximately 50% of the light incident on the plate at an angle of 45% is transmitted through the plate.

6. An integrated optical component as claimed in claim 1, characterized in that:
   the plate has a refractive index less than the refractive index of the input optical wave guide; and
   the output optical wave guide is arranged to receive light reflected by the plate.

7. An integrated optical component as claimed in claim 1, characterized in that:
   the first surface of the plate contacts only a portion of the end face of the input optical wave guide;
   the second surface of the plate contacts only a portion of the end face of the output optical wave guide; and
   the plate is arranged between only the contacted portions of the end faces of the input and output optical wave guides.

8. An integrated optical component as claimed in claim 7, characterized in that:
   the component comprises at least first and second output optical wave guides;
   the plate has a refractive index less than the refractive index of the second output optical wave guide;
   the plate having a thickness chosen such that light incident on the first surface of the plate from the input optical wave guide is totally reflected by the plate into the first output optical wave guide; and
   light from the input optical wave guide which is incident on the portion of the end face of the input optical wave guide which is not in contact with the plate is transmitted to the second output optical wave guide.

9. An integrated optical component as claimed in claim 8, characterized in that the refractive indices of the plate and wave guides, and the thickness of the plate are chosen such that light from the input optical wave guide incident on the plate at an angle of 45° is totally reflected by the plate.

10. An integrated optical component as claimed in claim 9, characterized in that the plate consists of a gaseous material or a vacuum.

11. An integrated optical component comprising:
    a semiconductor substrate;

an input optical wave guide monolithically integrated with the substrate, said wave guide having an end face and a refractive index;

an output optical wave guide monolithically integrated with the substrate, said wave guide having an end face and a refractive index;

a plate monolithically integrated with the substrate, said plate having a refractive index different from that of the input optical wave guide, said plate having first and second opposite parallel surfaces arranged perpendicular to the substrate, said first plate surface contacting a portion of the end face of the input optical wave guide, said second plate surface contacting a portion of the end face of the output optical wave guide, the portions of the end faces of the optical wave guides not contacting the plate being in contact with each other; and a light source monolithically integrated with the substrate, said light source being optically coupled to the input optical wave guide.

12. An integrated optical component comprising:
a semiconductor substrate;
an input optical wave guide monolithically integrated with the substrate, said wave guide having an end face and a refractive index;

an output optical wave guide monolithically integrated with the substrate, said wave guide having an end face and a refractive index, the end face of the output wave guide being in contact with the end face of the input wave guide; and a light source monolithically integrated with the substrate, said light source being optically coupled to the input optical wave guide;

characterized in that in a region surrounding the end faces of the wave guides, the wave guides are provided with a groove, said groove having first and second opposite parallel surfaces arranged perpendicular to the substrate, said first groove surface being transverse to the input optical wave guide, said second groove surface being transverse to the output optical wave guide, said groove containing a gaseous material or a vacuum.

13. An integrated optical component as claimed in claim 12, characterized in that:
the first surface of the groove contacts only a portion of the end face of the input optical wave guide; and
the second surface of the groove contacts only a portion of the end face of the output optical wave guide.

14. A method of manufacturing an integrated optical component, said method comprising the steps of:
providing a semiconductor substrate;
epitaxially growing an input optical wave guide on the substrate, said wave guide having an end face and a refractive index;
epitaxially growing an output optical wave guide on the substrate, said wave guide having an end face and a refractive index, said end face contacting the end face of the input optical wave guide; and
etching a groove in the input and output wave guides in a region surrounding the end faces of the optical wave guides, said groove having first and second opposite parallel surfaces arranged perpendicular to the substrate, said first groove surface being transverse to the input optical wave guide, said second groove surface being transverse to the output optical wave guide.

15. A method as claimed in claim 14, further comprising the step of depositing optical material in the groove.

16. An integrated optical component comprising:
a semiconductor substrate;
an input optical wave guide monolithically integrated with the substrate, said wave guide having an end face and a refractive index;
an output optical wave guide monolithically integrated with the substrate, said wave guide having an end face and a refractive index; and
a plate monolithically integrated with the substrate, said plate having a substantially uniform refractive index different from that of the input optical wave guide, said plate having first and second opposite parallel surfaces arranged perpendicular to the substrate, said first plate surface contacting the end face of the input optical wave guide, said second plate surface contacting the end face of the output optical wave guide.

17. An integrated optical component as claimed in claim 16, characterized in that:
the component comprises at least two output optical wave guides monolithically integrated with the substrate; and
the output optical wave guides have refractive indices equal to the refractive index of the input optical wave guide.

18. An integrated optical component as claimed in claim 17, characterized in that:
the plate has a refractive index greater than the refractive index of the input optical wave guide;
one output optical wave guide is arranged to receive light transmitted through the plate; and
the other output optical wave guide is arranged to receive light reflected by the plate.

19. An integrated optical component as claimed in claim 18, characterized in that:
the plate has a refractive index less than the refractive index of the input optical wave guide;
one output optical wave guide is arranged to receive light transmitted through the plate; and
the other output optical wave guide is arranged to receive light reflected by plate.

20. An integrated optical component as claimed in claim 19, characterized in that the plate has a thickness, and the indices of the plate and wave guides, and the thickness of the plate are chosen so that approximately 50% of light incident on the plate at an angle of 45° is reflected by the plate, and approximately 50% of the light incident on the plate at an angle of 45% is transmitted through the plate.

21. An integrated optical component as claimed in claim 16, characterized in that:
the plate has a refractive index less than the refractive index of the input optical wave guide; and
the output optical wave guide is arranged to receive light reflected by the plate.

22. An integrated optical component as claimed in claim 16, characterized in that:
the first surface of the plate contacts only a portion of the end face of the input optical wave guide;
the second surface of the plate contacts only a portion of the end face of the output optical wave guide; and
the plate is arranged between only the contacted portions of the end faces of the input and output optical wave guides.

23. An integrated optical component as claimed in claim 22, characterized in that:
   the component comprises at least first and second output optical wave guides;
   the plate has a refractive index less than the refractive index of the second output optical wave guide;
   the plate having a thickness chosen such that light incident on the first surface of the plate from the input optical wave guide is totally reflected by the plate into the first output optical wave guide; and
   light from the input optical wave guide which is incident on the portion of the end face of the input optical wave guide which is not in contact with the plate is transmitted to the second output optical wave guide.

24. An integrated optical component as claimed in claim 23, characterized in that the refractive indices of the plate and wave guides, and the thickness of the plate are chosen such that light from the input optical wave guide incident on the plate at an angle of 45° is totally reflected by the plate.

25. An integrated optical component as claimed in claim 24, characterized in that the plate consists of a gaseous material or a vacuum.

* * * * *